United States Patent [19]

Gleason et al.

[11] Patent Number: 4,626,363
[45] Date of Patent: Dec. 2, 1986

[54] CATIONIC ACRYLAMIDE EMULSION POLYMER BRINE THICKENERS

[75] Inventors: Patricia A. Gleason, Westfield; Marie A. Piccoline, Somerville, both of N.J.

[73] Assignee: National Starch and Chemical Corporation, Bridgewater, N.J.

[21] Appl. No.: 645,379

[22] Filed: Aug. 29, 1984

[51] Int. Cl.$^4$ .................. C09K 7/02; E21B 43/00
[52] U.S. Cl. .................. 252/8.514; 252/8.551
[58] Field of Search ............ 252/8.5 A, 8.5 C, 8.55 R, 252/8.55 D, 363.5; 526/292.95, 307

[56] References Cited

U.S. PATENT DOCUMENTS

| | | | |
|---|---|---|---|
| 3,624,019 | 11/1971 | Anderson et al. | 252/363.5 X |
| 3,744,566 | 7/1973 | Szabo et al. | 252/8.55 X |
| 4,034,809 | 7/1977 | Phillips et al. | 166/270 |
| 4,046,197 | 9/1977 | Gruesbeck et al. | 252/8.5 X |
| 4,077,930 | 3/1978 | Lim et al. | 526/307 X |
| 4,392,964 | 7/1983 | House et al. | 252/8.5 |
| 4,427,556 | 1/1984 | House et al. | 252/8.5 |
| 4,455,240 | 6/1984 | Costello | 252/8.5 |
| 4,490,261 | 12/1984 | Heilweil | 252/8.55 X |
| 4,554,081 | 11/1985 | Borchardt et al. | 252/8.5 |

FOREIGN PATENT DOCUMENTS 2077750  4/1985  United Kingdom .

Primary Examiner—Herbert B. Guynn
Attorney, Agent, or Firm—Lori D. Tolly; Edwin M. Szala

[57] ABSTRACT

Cationic emulsion polymers useful as thickening agents in aqueous dense brine solutions are disclosed. The cationic polymers are water-in-oil emulsion polymers of acrylamide or methacrylamide and a cationic monomer. The polymers have an intrinsic viscosity in 1.0 N KCl of at least 1 dl/g and preferably have an acrylamide or methacrylamide to cationic monomer molar ratio of about 60:40 to 95:5.

17 Claims, No Drawings

CATIONIC ACRYLAMIDE EMULSION POLYMER BRINE THICKENERS

BACKGROUND OF THE INVENTION

This invention relates to compositions useful as thickening agents in aqueous brine systems and to the aqueous well drilling and servicing fluids prepared therefrom.

In the drilling of subterranean wells, aqueous fluids containing no suspended solids have been used extensively in completion and workover operations in order to minimize damage to the production stratum caused primarily by fluid and solids invasion. After high solids drilling muds have been employed, these fluids are flushed through the well in order to remove any moveable solids which may cause clogging and in turn prevent oil from freely flowing into the producing zone. The fluids also function to control subsurface pressure and maintain hole stability while remaining stable at working temperatures. The fluids are concentrated water solutions of metal salts including, for example, KCl, NaCl, NaBr, $CaCl_2$, $CaBr_2$, $ZnCl_2$ and $ZnBr_2$. The salt or salts selected and the concentration employed are determined by the desired density and crystallization temperature of the fluid. Modern research has led to the development of a number of useful brines with densities ranging up to 19.2 ppg. (pounds per gallon).

Additives are used in the brine solutions to control and increase their viscosity which in turn enhances the cuttings carrying capacity of the brines, reduces fluid loss, and conditions and minimizes caving and water damage of the water-sensitive formation. Polysaccharide gums such as xanthan gum, guar gum, locust bean gum, carrageenan, and hydroxyethyl cellulose (HEC) have been employed to thicken brine systems. These additives, normally supplied in dry powder form, require special preparation and/or mixing and dispersing equipment when added to the brine systems. HEC and other polysaccharide additives surface-hydrate too rapidly and nonuniformly, resulting in clumps referred to as "fish eyes" which can cause clogging and formation damage. Many of these polysaccharide additives hydrate only after elevating the temperature of the brine. As these additives dissolve upon exposure to higher downhole temperatures, they cause brine viscosities to fluctuate resulting in unpredictable and undesirable latent viscosities. Moreover, many of the polysaccharides tend to also form separate gummy polymer layers in the higher density brines.

Various attempts have been made involving additional time and expense to overcome the dissolution problems described above. For example, in U.S. Pat. No. 4,392,964 issued on July 12, 1983 to R. House et al., a polymer composition prepared by mixing 5-30 parts of HEC with at least 40 parts of isopropanol is mixed with 3-40 parts water in order to thoroughly wet the HEC prior to addition to the brine system. In U.S. Pat. No. 4,415,463 issued on Nov. 15, 1983 to B. Mosier et al., natural polysaccharide gums such as carageenan and locust bean are treated with a basic nitrogen reagent to wet the polymer prior to addition to the brine system. In U.S. Pat. Nos. 4,435,564 and 4,439,333 issued on Mar. 6, 1984 and Mar. 27, 1984 respectively to R. House, HEC is first activated such that the HEC will disperse and hydrate in heavy brines. The activation process comprises admixing HEC in a solution of either an amino or phenolic compound and a water soluble organic liquid prior to brine addition. Some of the additives also become ineffective when added to brine systems having densities above about 12 ppg. In U.S. Pat. No. 4,420,406 issued on Dec. 13, 1983 to R. House et al. it was disclosed that heavy brine solutions having a narrow density range of 14.2 to 15.6 ppg could be effectively thickened with HEC depending on the presence or absence of $CaCl_2$ and the specific amount of $ZnBr_2$ in the brine.

Other problems still exist when the polysaccharides described above are added to brine solutions. Many of the polysaccharides are subject to incompatibility problems in the brines after a period of time. The polysaccharides also become thermally unstable when subjected to downhole temperatures above about 180° F. (82° C.). Furthermore some of the polysaccharides employed are subject to bacterial attack. For these reasons the subterranean well drilling industry is searching for other means to effectively thicken brine solutions.

It is therefore an object of the present invention to provide brine thickeners which will easily dissolve, be compatible in the brines, be thermally resistant, and not be subject to bacterial attack.

SUMMARY OF THE INVENTION

The present invention provides a thickened aqueous brine solution having a density of at least 11.1 ppg and a cationic water-in-oil emulsion polymer of acrylamide or methacrylamide and a cationic monomer having an intrinsic viscosity (I.V.) measured in 1.0N KCl of 1 dl/g or greater. The cationic polymers contemplated herein ordinarily have acrylamide or methacrylamide to cationic monomer molar ratios of about 60:40 to 95:5. Preferably the cationic monomers are selected from the group consisting of dimethyldiallyl ammonium chloride, methacrylamidopropyltrimethyl ammonium chloride, trimethylaminoethyl methacrylate and dimethylaminopropyl methacrylamide.

In a method of the present invention, the cationic emulsion polymer is added to an aqueous brine solution in an amount to thicken a well drilling or servicing fluid.

DESCRIPTION OF THE PREFERRED EMBODIMENTS

The cationic emulsion polymers useful herein are obtained by the polymerization of acrylamide or methacrylamide with a cationic monomer. Among the cationic monomers which are applicable for use herein, one may list for example: dialkylaminoalkyl(meth)acrylamides, tri-alkylaminoalkyl(meth)acrylamides, dialkylaminoalkyl(meth)acrylates, trialkylaminoalkyl(meth)acrylates and dialkyldiallyl ammonium halides. Most preferably the monomers are selected from the group consisting of dimethyldiallyl ammonium chloride and methacrylamidopropyltrimethyl ammonium chloride, hereinafter referred to as DMDAAC and MAPTAC respectively. Other cationic monomers preferably employed include dimethylaminopropyl methacrylamide (referred to as DMAPMA) and the quaternization products of dimethylaminoethyl methacrylate with methyl chloride (referred to herein as trimethylaminoethyl methacrylate or TMAEMA) and dimethylaminoethyl methacrylate with dimethyl sulfate. In addition, minor amounts of other polymerizable monomers may be employed in the preparation of the cationic emulsion polymer, however, no improvement over a polymer prepared with only acrylamide or methacrylamide and a cationic monomer is expected.

The cationic polymers will ordinarily have an acrylamide (ACM) or methacrylamide to cationic monomer molar ratio of about 60:40 to 95:5. The preferred molar ratio range for a given polymer will vary depending on the cationic monomer employed and the density of the brine to be treated. For instance the preferred molar ratio for ACM:TMAEMA copolymer is about 70:30 to 80:20 whereas ACM:DMDAAC and ACM:MAPTAC copolymers preferably have a molar ratio of about 80:20 to 91:9.

The cationic polymers may be prepared according to any number of conventional emulsion polymerization techniques known to those skilled in the art. Suitable processes include those taught in U.S. Pat. Nos. 3,284,393 (issued Nov. 8, 1966 to J. Vanderhoff et al.), 3,826,771 (issued July 30, 1974 to D. Anderson et al.) and 4,077,930 (issued Mar. 7, 1978 to S. Lim et al.). The polymers will generally be present in the emulsion in amounts of about 25–50% solids by weight.

It should be noted that any emulsion polymerization technique may be employed as long as the resultant polymers are of sufficiently high molecular weight as represented by intrinsic viscosities measured in 1.0N KCl of about 1 to 10, preferably 3.5 to 6.5, and most preferred 5.0 to 6.0. It has been found that as the intrinsic viscosity of the cationic polymer increases above about 7.0, there is a tendency in some brine systems for such a polymer to not only thicken the brine solution but also to cause the solution to become dilatant. Such a physical trait may be noted by evaluating the rheological data obtained from a treated brine solution. If the apparent viscosity of the solution (the Baroid reading at 600 rpm divided by 2) is greater than the Baroid reading taken at 300 rpm, the solution is said to be dilatant to some extent. As the difference between these two values increases, the fluid is pumped with less ease which in turn puts an added strain on the pumping equipment. Large fluctuations in viscosity readings are observed in a very dilatant system. When describing the brine solutions herein, a solution referred to as being stringy does not connote the same meaning as being dilatant. A solution is referred to as stringy if it exhibits a slightly cohesive texture upon visual observation under non-shear conditions. It should be noted that a stringy solution does not pose pumping problems to the same degree as a fluid which is dilatant.

The quantity of the cationic polymers utilized will vary with circumstances depending on such factors as the density and composition of the brine solution to be treated. The cationic emulsion polymers are extremely effective as thickeners for heavy brine solutions, having densities of at least 11.1 ppg which comprise aqueous solutions of a water soluble salt of a multivalent metal including $CaCl_2$, $CaBr_2$, $ZnCl_2$, $ZnBr_2$, and mixtures thereof. We have found the cationic emulsion polymers to be especially effective in the denser, more difficult to thicken zinc-containing brines having densities of 16.0 ppg and greater. Other factors influencing the treatment levels of the polymers employed include the formation strata type encountered, drilling depths, and temperatures and pressures encountered. Ordinarily the polymers will impart a viscosifying effect to heavy brine solutions when used in amounts (based on dry solids) of about 0.25 to 5.0 pounds per 42-gallon barrel (ppb). Preferably the polymer is added at the 0.5 to 3.0 ppb treatment level. The exact amount to be added can be determined by simple routine tests known to those skilled in the art at the time the addition is made.

The following examples are presented to particularly illustrate the invention but they are not intended to limit it in any manner except as it is limited in the appended claims. All percentages given in the examples are by weight unless otherwise indicated. All physical property measurements were made in accordance with testing procedures set forth in Standard Procedure For Testing Drilling Fluids API Recommended Practice, 13B, May 1982, Sections 2 and 3.

In formulating the brine solutions, the following salt solutions were employed:

| Brine Density (ppg) | Brine Composition |
|---|---|
| 11.6 | aqueous solution containing 37.6% $CaCl_2$ and 1.65% $CaBr_2$ |
| 14.4 | aqueous solution containing 30.7% $CaBr_2$ and 35.8% $CaCl_2$ |
| 16.0 | aqueous solution containing 6.35% $ZnBr_2$, 14.5% $CaCl_2$, and 45.9% $CaBr_2$ |
| 19.2 | aqueous solution containing 26.7% $ZnBr_2$ and 43.03% $CaBr_2$ |

EXAMPLE 1

This example illustrates the ability of ACM:DMDAAC copolymers to effectively thicken various heavy brine solutions. The copolymers evaluated are described below:

| Copolymer | ACM:DMDAAC Molar Ratio | Intrinsic Viscosity dl/g |
|---|---|---|
| A | 80:20 | 3.8 |
| B | 80:20 | 5.2 |
| C | 90:10 | 5.0 |
| D | 90:10 | 7.8 |
| E | 95:5 | 10.8 |

The copolymers were evaluated in 11.6 and 16.0 ppg dense brine solutions. To 350 ml of each brine was added 0.5 or 1.0 g. (based on dry solids) of each copolymer. This is equivalent to treatment levels of 0.5 and 1.0 ppb. The treated brines were mixed with a Hamilton Beach Multimixer for 20 minutes, qualitatively evaluated for compatibility, then sealed in glass jars and statically aged at 180° F. (82° C.) for 16 hours. The flow properties and gel strengths of the samples were measured at 180° F. (82° C.), 115° F. (46° C.) and room temperature. The apparatus used to evaluate the treated brine solutions was a Baroid Viscometer Model

TABLE I

| COPOLYMER | TREATMENT LEVEL (ppb) | COMPATIBILITY | RHEOLOGY IN DEGREES BAROID IN 11.6 ppg SOLUTION | | | | | | | | |
|---|---|---|---|---|---|---|---|---|---|---|---|
| | | | @ 180° F. (82° C.) | | | @ 115° F. (46° C.) | | | @ Room Temp. | | |
| | | | 600 | 300 | GS | 600 | 300 | GS | 600 | 300 | GS |
| Blank | — | — | 9 | 5 | 1 | 14 | 7 | 1 | 22 | 11 | 1 |
| HEC | 0.5 | gummy polymer layer* | 18 | 10 | 2 | 29 | 16 | 2 | 91 | 48 | 1 |

TABLE I-continued

| COPOLYMER | TREATMENT LEVEL (ppb) | COMPATIBILITY | RHEOLOGY IN DEGREES BAROID IN 11.6 ppg SOLUTION | | | | | | | | |
|---|---|---|---|---|---|---|---|---|---|---|---|
| | | | @ 180° F. (82° C.) | | | @ 115° F. (46° C.) | | | @ Room Temp. | | |
| | | | 600 | 300 | GS | 600 | 300 | GS | 600 | 300 | GS |
| | 1.0 | gummy polymer layer* | 26 | 14 | 3 | 35 | 19 | 2 | 90 | 55 | 2 |
| A | 0.5 | ++ | 12 | 6 | 2 | 25 | 12 | 1 | 42 | 19 | 2 |
| | 1.0 | ++ | 18 | 10 | 2 | 33 | 16 | 1 | 44 | 23 | 1 |
| B | 0.5 | ++ | 12 | 7 | 1 | 20 | 10 | 1 | 30 | 14 | 1 |
| | 1.0 | ++ | 15 | 8 | 1 | 31 | 15 | 1 | 39 | 19 | 1 |
| C | 0.5 | ++ | 10 | 5 | 2 | 19 | 10 | 2 | 26 | 13 | 2 |
| | 1.0 | ++ | 14 | 7 | 1 | 24 | 12 | 1 | 31 | 16 | 2 |
| D | 0.5 | ++ | 19 | 10 | 2 | 45 | 19 | 2 | 48 | 37 | 2 |
| | 1.0 | ++(s) | 38 | 22 | 2 | 58 | 34 | 2 | 60 | 43 | 2 |
| E | 0.5 | ++ | 33 | 18 | 2 | OS | 38 | 1 | OS | 48 | 1 |
| | 1.0 | ++ | 68 | 43 | 2 | OS | 58 | 2 | OS | >80 | 2 |

GS = 10 second gel strength (lb./100 ft.$^2$)
*layer observed upon surface of brine solution
++ = good compatibility (no insolubles)
s = stringy
OS = off scale (>320 degrees Baroid)

TABLE II

| COPOLYMER | TREATMENT LEVEL (ppb) | COMPATIBILITY | RHEOLOGY IN DEGREES BAROID IN 16.0 ppg SOLUTION | | | | | | | | |
|---|---|---|---|---|---|---|---|---|---|---|---|
| | | | @ 180° F. (82° C.) | | | @ 115° F. (46° C.) | | | @ Room Temp. | | |
| | | | 600 | 300 | GS | 600 | 300 | GS | 600 | 300 | GS |
| Blank | — | | 17 | 8 | 1 | 27 | 14 | 1 | 41 | 20 | 1 |
| HEC | 0.5 | grainy insolubles | 17 | 10 | 2 | 30 | 15 | 2 | 48 | 25 | 2 |
| | 1.0 | grainy insolubles | 15 | 8 | 2 | 30 | 14 | 2 | 50 | 25 | 2 |
| A | 0.5 | ++ | 23 | 12 | 1 | 58 | 28 | 2 | 88 | 42 | 1 |
| | 1.0 | few tiny lumps | 39 | 19 | 1 | 86 | 41 | 2 | 100 | 55 | 1 |
| B | 0.5 | ++ | 19 | 9 | 2 | 44 | 22 | 1 | 58 | 27 | 1 |
| | 1.0 | ++ | 31 | 15 | 1 | 66 | 34 | 1 | 78 | 32 | 1 |
| C | 0.5 | ++ | 23 | 12 | 1 | 40 | 20 | 1 | 71 | 31 | 1 |
| | 1.0 | ++ | 34 | 18 | 1 | 78 | 35 | 1 | 96 | 45 | 1 |
| D | 0.5 | ++ | 58$^s$ | 30 | 2 | 83$^s$ | 58 | 1 | OS | 58 | 2 |
| | 1.0 | ++ | 78$^s$ | 58 | 2 | 105$^s$ | 80 | 2 | OS | OS | 3 |
| E | 0.5 | ++ | 70$^s$ | 53 | 1 | OS | 70 | 2 | OS | OS | 3 |
| | 1.0 | ++ | OS | 70 | 2 | OS | OS | 2 | OS | OS | 3 |

GS = 10 second gel strength (lb./100 ft.$^2$)
++ = good compatibility (no solubles)
$^s$ = stringy
OS = off scale (>320 degrees Baroid)

286-76163. Readings were taken at 600 and 300 rpm. HEC (Natrosol 250 MR obtained from Hercules) was also evaluated for comparison in this example as well as all subsequent examples. The results may be found in Tables I and II.

The results of Tables I and II indicate there is a significant difference in compatibility between the ACM:DMDAAC copolymers and HEC in the brines. The cationic copolymers dissolved easily in the brines while HEC provided an undesirable gummy polymer larger in the 11.6 ppg brine and grainy insolubles in the 16.0 ppg brine. It was noted that the ACM:DMDAAC copolymers thickened both brine solutions while being more effective in the denser brine. Copolymer E, the 95:5 molar ratio ACM:DMDAAC copolymer having an IV of 10.8 caused the brines to be dilatant. It was noted that as the molecular weight and molar ratio of AMC to DMDAAC increased, the brines treated therewith became more dilatant.

EXAMPLE 2

This example illustrates the ability of ACM:MAPTAC and ACM:TMAEMA copolymers to effectively thicken various heavy brine solutions. The copolymers evaluated are described below:

| Copolymer | Comonomer | ACM:Comonomer Molar Ratio | Intrinsic Viscosity dl/g |
|---|---|---|---|
| F | MAPTAC | 70:30 | 2.3 |
| G | MAPTAC | 70:30 | 4.2 |
| H | MAPTAC | 80:20 | 4.15 |
| I | MAPTAC | 91:9 | 4.15 |
| J | MAPTAC | 91:9 | 6.05 |
| K | TMAEMA | 70:30 | 6.2 |
| L | TMAEMA | 80:20 | 7.3 |

The copolymers were evaluated in 14.4 and 19.2 ppg dense brine solutions by the procedure described in Example 1. The fluid loss of the treated brines at room temperature was also measured. The results may be found in Tables III and IV.

TABLE III

| COPOLYMER | TREATMENT LEVEL (ppb) | COMPATIBILITY | 14.4 ppg DENSE BRINE SOLUTION RHEOLOGY IN DEGREES BAROID | | | | | | API Fluid Loss (cc at 30 min.) |
|---|---|---|---|---|---|---|---|---|---|
| | | | @ 180° F. (82° C.) | | @ 115° F. (46° C.) | | @ Room Temp. | | |
| | | | 600 | 300 | 600 | 300 | 600 | 300 | |
| Blank | — | — | 18 | 9 | 38 | 19 | 66 | 34 | CFL |
| HEC | 1.0 | gummy polymer layer* | 25 | 13 | 46 | 24 | 90 | 55 | 5 |
| F | 1.0 | ++ | 27 | 13 | 60 | 30 | 108 | 57 | 12 |
| G | 1.0 | ++ | 41 | 18 | 75 | 38 | 112 | 58 | 5 |
| H | 1.0 | ++ | 30 | 14 | 67 | 33 | 101 | 52 | 12 |
| I | 1.0 | ++ | 33 | 17 | 66 | 33 | 118 | 58 | — |
| J | 1.0 | ++ | 40 | 26 | 72 | 41 | 130 | 70 | 5 |
| K | 1.0 | ++ | 42 | 20 | 72 | 37 | 110 | 56 | 2 |
| L | 1.0 | ++ | 32 | 14 | 87 | 38 | 130–135 | 69 | 2 |

CFL = complete fluid loss (>300 cc)
++ = good compatibility (no solubles)
* = layer observed upon surface of brine solution

TABLE IV

| CO-POLYMER | TREATMENT LEVEL (ppb) | COMPATIBILITY | 19.2 ppg DENSE BRINE SOLUTION RHEOLOGY IN DEGREES BAROID | | | | | | API Fluid Loss (cc at 30 min.) |
|---|---|---|---|---|---|---|---|---|---|
| | | | @ 180° F. (82° C.) | | @ 115° F. (46° C.) | | @ Room Temp. | | |
| | | | 600 | 300 | 600 | 300 | 600 | 300 | |
| Blank | — | — | 16 | 8 | 31 | 16 | 53 | 27 | CFL |
| HEC | 0.5 | gummy polymer layer* | 44 | 24 | 64 | 36 | 108 | 62 | — |
| | 1.0 | gummy polymer layer* | 28 | 15 | 54 | 28 | 89 | 48 | 4 |
| F | 0.5 | ++ | 27 | 14 | 48 | 25 | 72 | 37 | 11 |
| G | 1.0 | few tiny lumps | 52 | 27 | 75 | 39 | 143 | 74 | 60 |
| H | 0.5 | ++ | 26 | 14 | 38 | 20 | 75 | 39 | 9 |
| I | 0.5 | ++ | 28 | 15 | 45 | 24 | 87 | 45 | — |
| J | 0.5 | ++ | 38$^s$ | 16 | 55 | 30 | 107 | 54 | 5 |
| K | 1.0 | ++ | 35 | 18 | 57 | 29 | 114 | 56 | 31 |
| L | 1.0 | ++ | 80–90$^s$ | 45–50 | 110–160$^s$ | 65–85 | 120–180$^s$ | 120–140 | 13 |

++ = good compatibility (no solubles)
* = layer observed upon surface of brine solution
$^s$ = stringy
CFL = complete fluid loss (>300 cc)

As can be seen in the tables, the cationic copolymers effectively thickened and were compatible with both the 14.4 and 19.2 ppg brines while HEC produced gummy polymer layers which had the appearance of gels on top of the brines. The cationic copolymers were seen to provide good to excellent fluid loss control in the 14.4 ppg brine and many provided good fluid loss control in the 19.2 ppg brine as well. Sample L, an 80:20 ACM:TMAEMA copolymer having an I.V. of 7.3, was noted to thicken the brines, however, the fluctuations in Baroid rheology observed in the 19.2 ppg brine indicated the solution to be very dilatant.

EXAMPLE 3

An 80:20 and a 90:10 molar ratio ACM:DMDAAC emulsion copolymer (samples B and C respectively of Example 1) were evaluated in four brine solutions at treatment levels of 0.5 to 2.0 ppb. Excellent results were obtained. The data is given in Table V.

EXAMPLE 4

This example illustrates the ability of an ACM:D-MAPMA copolymer to effectively thicken various heavy brine solutions. The cationic acrylamide emulsion copolymer employed contained 20 mole percent of the cationic tertiary amine comonomer and had an I.V. of 1.35 dl/g. The treated brines were evaluated by the procedure described in Example 1. Rheology data may be found in Table VI.

TABLE V

| CO-POLYMER | BRINE DENSITY (ppg) | TREATMENT LEVEL (ppb) | COMPATIBILITY | RHEOLOGY IN DEGREES BAROID | | | | | | | | |
|---|---|---|---|---|---|---|---|---|---|---|---|---|
| | | | | @ 180° F. (82° C.) | | | @ 115° F. (46° C.) | | | @ Room Temp. | | |
| | | | | 600 | 300 | GS | 600 | 300 | GS | 600 | 300 | GS |
| Blank | 11.6 | — | — | 9 | 5 | 1 | 14 | 7 | 1 | 22 | 11 | 1 |
| HEC | 11.6 | 0.5 | gummy polymer layer* | 18 | 10 | 2 | 29 | 16 | 2 | 91 | 48 | 1 |
| | 11.6 | 1.0 | gummy polymer layer* | 26 | 14 | 3 | 35 | 19 | 2 | 90 | 55 | 2 |
| | 11.6 | 1.5 | gummy polymer layer* | 35 | 19 | 3 | 42 | 24 | 3 | 124 | 78 | 3 |
| | 11.6 | 2.0 | gummy polymer layer* | 40 | 22 | 3 | 67 | 38 | 3 | 152 | 99 | 4 |
| B | 11.6 | 0.5 | ++ | 12 | 7 | 1 | 20 | 10 | 1 | 30 | 14 | 1 |
| | 11.6 | 1.0 | ++ | 15 | 8 | 1 | 31 | 15 | 1 | 39 | 19 | 1 |
| | 11.6 | 1.5 | ++ | 29 | 14 | 2 | 35 | 18 | 1 | 75 | 39 | 2 |
| | 11.6 | 2.0 | ++ | 40 | 20 | 2 | 54 | 28 | 3 | 95 | 52 | 4 |
| C | 11.6 | 0.5 | ++ | 10 | 5 | 2 | 19 | 10 | 2 | 26 | 13 | 2 |
| | 11.6 | 1.0 | ++ | 14 | 7 | 1 | 24 | 12 | 1 | 31 | 16 | 2 |
| | 11.6 | 1.5 | ++ | 20 | 10 | 2 | 30 | 15 | 2 | 43 | 23 | 2 |
| | 11.6 | 2.0 | ++ | 24 | 12 | 3 | 42 | 22 | 2 | 56 | 30 | 3 |
| Blank | 14.4 | — | — | 18 | 9 | 1 | 38 | 19 | 1 | 66 | 34 | 1 |

TABLE V-continued

| CO-POLYMER | BRINE DENSITY (ppg) | TREATMENT LEVEL (ppb) | COMPATIBILITY | RHEOLOGY IN DEGREES BAROID | | | | | | | | |
|---|---|---|---|---|---|---|---|---|---|---|---|---|
| | | | | @ 180° F. (82° C.) | | | @ 115° F. (46° C.) | | | @ Room Temp. | | |
| | | | | 600 | 300 | GS | 600 | 300 | GS | 600 | 300 | GS |
| HEC | 14.4 | 0.5 | gummy polymer layer* | 27 | 14 | 2 | 4 | 22 | 2 | 92 | 52 | 2 |
| | 14.4 | 1.0 | gummy polymer layer*,s | 25 | 13 | 2 | 46 | 24 | 2 | 88 | 46 | 2 |
| | 14.4 | 1.5 | gummy polymer layer*,s | 23 | 12 | 2 | 36 | 18 | 2 | 100 | 53 | 2 |
| | 14.4 | 2.0 | gummy polymer layer*,s | 30 | 14 | 2 | 44 | 24 | 2 | 104 | 57 | 2 |
| B | 14.4 | 0.5 | ++ | 23 | 12 | 1 | 47 | 24 | 1 | 64 | 32 | 1 |
| | 14.4 | 1.0 | ++ | 33 | 16 | 1 | 70 | 35 | 1 | 97 | 47 | 1 |
| | 14.4 | 1.5 | ++ | 62 | 32 | 2 | 104 | 53 | 2 | 134 | 80 | 3 |
| | 14.4 | 2.0 | ++ | 71 | 36 | 2 | 126 | 65 | 2 | 150 | 92 | 4 |
| C | 14.4 | 0.5 | ++ | 22 | 11 | 1 | 40 | 21 | 1 | 63 | 32 | 2 |
| | 14.4 | 1.0 | ++ | 28 | 15 | 1 | 74 | 39 | 2 | 67 | 34 | 1 |
| | 14.4 | 1.5 | ++ | 46 | 25 | 1 | 88 | 46 | 3 | 102 | 53 | 2 |
| | 14.4 | 2.0 | ++ | 55 | 29 | 1 | 47 | 24 | 1 | 124 | 64 | 2 |
| Blank | 16.0 | — | — | 17 | 8 | 1 | 27 | 14 | 1 | 41 | 20 | 1 |
| HEC | 16.0 | 0.5 | grainy insolubles | 17 | 10 | 2 | 30 | 15 | 2 | 48 | 25 | 2 |
| | 16.0 | 1.0 | grainy insolubles | 15 | 8 | 2 | 30 | 14 | 2 | 50 | 25 | 2 |
| | 16.0 | 1.5 | grainy insolubles | 14 | 7 | 2 | 34 | 15 | 2 | 48 | 24 | 2 |
| | 16.0 | 2.0 | grainy insolubles | 15 | 8 | 2 | 34 | 16 | 2 | 52 | 26 | 2 |
| B | 16.0 | 0.5 | ++ | 19 | 9 | 2 | 44 | 22 | 1 | 58 | 27 | 1 |
| | 16.0 | 1.0 | ++ | 31 | 15 | 1 | 66 | 34 | 1 | 78 | 32 | 1 |
| | 16.0 | 1.5 | ++ | 51 | 25 | 1 | 64 | 32 | 2 | 98 | 47 | 2 |
| | 16.0 | 2.0 | thin polymer layer* | 66 | 32 | 2 | 67 | 35 | 2 | 118 | 60 | 2 |
| C | 16.0 | 0.5 | ++ | 23 | 12 | 1 | 40 | 20 | 1 | 71 | 31 | 1 |
| | 16.0 | 1.0 | ++ | 34 | 18 | 1 | 78 | 35 | 1 | 96 | 45 | 1 |
| | 16.0 | 1.5 | ++ | 34 | 18 | 2 | 50 | 27 | 2 | 144 | 80 | 2 |
| | 16.0 | 2.0 | thin polymer layer* | 42 | 22 | 2 | 58 | 30 | 3 | 158 | 52 | 2 |
| Blank | 19.2 | — | — | 16 | 8 | 0 | 31 | 16 | 1 | 53 | 27 | 0 |
| HEC | 19.2 | 0.5 | gummy polymer layer* | 44 | 24 | 1 | 64 | 36 | 1 | 102 | 62 | 1 |
| | 19.2 | 1.0 | gummy polymer layer* | 24 | 12 | 1 | 42 | 24 | 1 | 164 | 89 | 3 |
| | 19.2 | 1.5 | gummy polymer layer* | 24 | 12 | 1 | 42 | 24 | 1 | 215 | 133 | 4 |
| | 19.2 | 2.0 | gummy polymer layer* | 26 | 13 | 1 | 42 | 25 | 1 | 242 | 157 | 7 |
| B | 19.2 | 0.5 | thin polymer layer* | 23 | 12 | 2 | 53 | 27 | 1 | 71 | 36 | 1 |
| | 19.2 | 1.0 | thin polymer layer* | 41 | 21 | 1 | 69 | 35 | 1 | 98 | 51 | 1 |
| | 19.2 | 1.5 | thin polymer layer* | 73 | 38 | 2 | 103 | 51 | 3 | 168 | 98 | 2 |
| | 19.2 | 2.0 | thin polymer layer* | 90 | 49 | 2 | 126 | 81 | 3 | 182 | 126 | 4 |
| C | 19.2 | 0.5 | thin polymer layer* | 30 | 16 | 1 | 41 | 22 | 1 | 75 | 38 | 1 |
| | 19.2 | 1.0 | ++ | 35 | 18 | 1 | 80 | 42 | 1 | 104 | 53 | 1 |
| | 19.2 | 1.5 | ++ | 66 | 37 | 2 | 76 | 42 | 2 | 143 | 79 | 2 |
| | 19.2 | 2.0 | ++ | 69 | 37 | 2 | 81 | 46 | 3 | 180 | 98 | 3 |

GS = 10 second gel strength (lb./100 ft.$^2$)
++ = good compatibility (no insolubles)
* = layer observed upon surface of brine solution
s = stringy

TABLE VI

| BRINE DENSITY (ppg) | TREATMENT LEVEL OF 80:20 ACM:DMAPMA (ppb) | Rheology in Degrees Baroid | | | | | | | | |
|---|---|---|---|---|---|---|---|---|---|---|
| | | @ 180° F. (82° C.) | | | @ 115° F. (42° C.) | | | @ Room Temp. | | |
| | | 600 | 300 | GS | 600 | 300 | GS | 600 | 300 | GS |
| 11.6 | Blank | 9 | 5 | 1 | 14 | 7 | 1 | 22 | 11 | 1 |
| | 3.0 | 16 | 9 | 0 | 24 | 13 | 0 | 34 | 18 | 0 |
| 14.4 | Blank | 18 | 9 | 1 | 38 | 19 | 1 | 66 | 34 | 1 |
| | 3.0 | 35 | 19 | 0 | 60 | 30 | 0 | 93 | 44 | 1 |
| 16.0 | Blank | 17 | 8 | 1 | 27 | 14 | 1 | 41 | 20 | 1 |
| | 3.0 | 27 | 15 | 0 | 42 | 21 | 0 | 61 | 30 | <1 |
| 19.2 | Blank | 16 | 8 | 0 | 31 | 16 | 0 | 53 | 27 | 0 |
| | 1.0 | 25 | 13 | 0 | 45 | 24 | 0 | 72 | 37 | 1 |
| | 3.0 | 32 | 17 | 0 | 60 | 31 | 0 | 102 | 52 | 1 |

In addition to being compatible in all the brines, the results showed that the ACM:DMAPMA copolymer did thicken each as well. The copolymer was seen to be especially effective in the 19.2 ppg zinc-containing brine.

EXAMPLE 5

This example illustrates the improved solubility of the copolymers described herein in comparison to other polymers which are commonly used as brine thickeners.

A 14.4 ppg dense brine solution was treated with various polymers at the 1.0 ppb addition level. Samples were aged at 180° F. for 16 hours and evaluated as described in Example 1. A duplicate series of samples was aged at room temperature and evaluated for comparison. As can be seen by the data in Table VII, the viscosity measured at room temperature of the sample containing Copolymer G (described in Example 2) after 180° F. aging was very similar to the viscosity of the room temperature-aged sample. This indicates the copolymer was fully dissolved in the brine at room temperature. The viscosities of the heat-aged brines treated with the hydroxyethyl cellulose and xanthan gum, however, were almost doubled that of the room temperature-aged samples. The latent viscosities of these samples indicates that the polysaccharide gums did not completely dissolve in the brines at room temperature. Such viscosity fluctuations caused by exposure to heat are undesirable in well servicing operations.

TABLE VII

| Polymer | Treatment Level ppb | RHEOLOGY IN DEGREES BAROID AT ROOM TEMP. | | | |
|---|---|---|---|---|---|
| | | After Ageing 16 hours @ 180° F. (82° C.) | | After Ageing 16 Hours @ Room Temp. | |
| | | 600 | 300 | 600 | 300 |
| Blank | — | 60 | 29 | 67 | 32 |
| HEC | 1.0 | 149 | 81 | 67 | 30 |
| Xanthan gum | 1.0 | 112 | 57 | 63 | 29 |
| Copolymer G | 1.0 | 128 | 67 | 125 | 64 |

EXAMPLE 6

This examples illustrates the ability of the copolymers described herein to effectively thicken brine solutions after exposure to high temperatures.

Four dense brine solutions were treated at a 1.0 ppb addition level with a 90:10 molar ratio copolymer of ACM:DMDAAC or an 80:20 molar ratio copolymer of ACM:MAPTAC (copolymers C and H respectfully) and aged at 300° F. (149° C.) for 16 hours. The solution rheologies were evaluated at room temperature. The results may be found in Table VIII.

TABLE VIII

| Brine Density (ppg) | Copolymer | Rheology in Degrees Baroid at Room Temp. After Ageing 16 Hours @ 300 F. (149° C.) | | |
|---|---|---|---|---|
| | | 600 | 300 | GS |
| 11.6 | Blank | 22 | 11 | 1 |
| | HEC | 18 | 9 | 0 |
| | C | 20 | 10 | 0 |
| | H | 20 | 10 | 0 |
| 14.4 | Blank | 66 | 34 | 1 |
| | HEC | 75 | 38 | <1 |
| | C | 120 | 56 | 1 |
| | H | 80 | 39 | 0 |
| 16.0 | Blank | 41 | 20 | 1 |
| | HEC | 50 | 25 | 0 |
| | C | 51 | 25 | 0 |
| | H | 60 | 31 | 0 |
| 19.2 | Blank | 53 | 27 | 0 |
| | HEC | 58 | 28 | 0 |
| | C | 57 | 28 | 0 |
| | H | 160 | 83 | 0 |

The results show that the cationic copolymers described herein thicken as well as and often better than HEC after exposure to high temperatures in various dense brine systems.

Summarizing, the cationic emulsion polymers herein have been found to be useful as thickeners in dense brine solutions. Treated brines useful as drilling and servicing fluids in drilling operations are obtained when the cationic emulsion polymers are employed as brine thickeners.

The preferred embodiments of the present invention having been described above, various modifications and improvements thereof will now become readily apparent to those skilled in the art. Accordingly, the spirit and scope of the present invention is defined not by the foregoing disclosure, but only by the appended claims.

We claim:

1. A thickened, solids free, aqueous drilling and servicing brine having a density of at least 14.4 ppg. comprising (a) an aqueous solution of at least one water-soluble salt of a multivalent metal, and (b) a cationic water-in-oil emulsion polymer of acrylamide or methacrylamide and a cationic monomer selected from the group consisting of a dialkylaminoalkyl acrylamide or methacrylamide, a trialkylaminoalkyl acrylamide or methacrylamide, a trialkylaminoalkyl acrylate or methacrylate, and a dialkyldiallyl ammonium halide, wherein the acrylamide or methacrylamide to cationic monomer molar ratio of the polymer is about 70:30 to 95:5, the polymer having an I.V. in 1.0N KCl of about 1.0 to 7.0 dl/g and being present in a compatible and viscosifying amount; the thickened brine characterized by being substantially non-dilatent.

2. The aqueous brine of claim 1, wherein the cationic monomer is dimethyldiallyl ammonium chloride.

3. The aqueous brine of claim 2, wherein the acrylamide or methacrylamide to cationic monomer molar ratio is about 80:20 to 91:9.

4. The aqueous brine of claim 3, wherein the cationic emulsion polymer has an I.V. of about 3.8 to 5.0.

5. The aqueous brine solution of claim 1, wherein the cationic monomer is methacrylamidopropyltrimethyl ammonium chloride.

6. The aqueous brine of claim 5, wherein the cationic emulsion polymer has an I.V. of about 2.3 to 6.0.

7. The aqueous brine of claim 6, wherein the acrylamide or methacrylamide to cationic monomer molar ratio is about 80:20 to 91:9.

8. The aqueous brine of claim 1, wherein the cationic monomer is the quarternization product of dimethylaminoethyl methacrylate with methyl chloride or dimethyl sulfate.

9. The aqueous brine of claim 8, wherein the acrylamide or methacrylamide to cationic monomer molar ratio is about 70:30 to 7.5 and the polymer has an I.V. of about 6.0 to 7.5.

10. The aqueous brine of claim 1, wherein the cationic monomer is dimethylaminopropyl methacrylamide.

11. A process for thickening a heavy, solids free, aqueous drilling and servicing brine having a density of at least 14.4 ppg. comprised of an aqueous solution of at least one water-soluble salt of a multivalent metal, comprising admixing in the brine a compatible and viscosifying amount of a cationic water-in-oil emulsion polymer of acrylamide or methacrylamide and a cationic monomer selected from the group consisting of a dialkylaminoalkyl acrylamide or methacrylamide, a trialkylaminoalkyl acrylamide or methacrylamide, a trialkylaminoalkyl acrylate or methacrylate, and a dialkyldiallyl ammonium halide, wherein the polymer has an I.V. in 1.0N KCl of about 1.0 to 7.0 dl/g and the acrylamide or methacrylamide to cationic monomer molar ratio of the polymer is about 70:30 to 95:5; the thickened brine characterized by being substantially non-dilatent.

12. The process of claim 11, wherein 0.25 to 5.0 ppb of the cationic emulsion polymer is admixed.

13. The process of claim 12, wherein 0.5 to 3.0 ppb of the cationic emulsion polymer is admixed.

14. The process of claim 11, wherein the water soluble salt is selected from the group consisting of $CaCl_2$, $CaBr_2$, $ZnCl_2$, $ZnBr_2$ and mixtures thereof.

15. The process of claim 14, wherein the cationic monomer is dimethyldiallyl ammonium chloride.

16. The process of claim 14, wherein the cationic monomer is dimethylaminopropyl methacrylamide or methacrylamidopropyltrimethyl ammonium chloride.

17. The process of claim 14, wherein the cationic monomer is the quarternization product of dimethylaminoethyl methacrylate with methyl chloride or dimethyl sulfate.

* * * * *